United States Patent … US 9,829,702 B2
Erbe et al.                                        (45) Date of Patent:     Nov. 28, 2017

(54) ADJUSTABLE, DEFORMABLE MIRROR FOR COMPENSATING IRREGULARITIES OF A BEAM

(71) Applicant: JENOPTIK Optical Systems GmbH, Jena (DE)

(72) Inventors: Torsten Erbe, Jena (DE); Jan Werschnik, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 0 days.

(21) Appl. No.: 15/125,383

(22) PCT Filed: Mar. 10, 2015

(86) PCT No.: PCT/EP2015/000535
§ 371 (c)(1),
(2) Date: Sep. 12, 2016

(87) PCT Pub. No.: WO2015/135648
PCT Pub. Date: Sep. 17, 2015

(65) Prior Publication Data
US 2017/0075111 A1    Mar. 16, 2017

(30) Foreign Application Priority Data
Mar. 10, 2014 (DE) .................. 10 2014 103 157

(51) Int. Cl.
G02B 27/00  (2006.01)
G02B 26/08  (2006.01)
G02B 7/182  (2006.01)

(52) U.S. Cl.
CPC ....... *G02B 27/0068* (2013.01); *G02B 7/1821* (2013.01); *G02B 26/0825* (2013.01)

(58) Field of Classification Search
None
See application file for complete search history.

(56) References Cited

U.S. PATENT DOCUMENTS 5,142,132 A    8/1992  MacDonald et al.
6,411,426 B1   6/2002  Meehan et al.
(Continued)

FOREIGN PATENT DOCUMENTS

DE        525 690        5/1931
DE    196 28 672 A1      1/1998
(Continued)

OTHER PUBLICATIONS

Hamelinck et al., "Actuator tests for a large deformable membrane mirror", Advances in Adaptive Optics II, Proc. of SPIE vol. 6272, 627225, pp. 1-9, doi: 10.1117/12.671082, The Netherlands (2006).
(Continued)

*Primary Examiner* — Jennifer L. Doak
(74) *Attorney, Agent, or Firm* — Muncy, Geissler, Olds & Lowe, P.C.

(57) ABSTRACT

The invention relates to an adjustable, deformable mirror for compensating irregularities of a beam with a mirror element for reflecting incident rays of the beam, a base body for securing the mirror element and at least one actuating element for applying forces to the mirror element, wherein the mirror element is a planar element with a thickness of at least 1 mm, and the actuating element is a lever mechanism with lever elements. The invention also relates to a method for compensating irregularities of a beam as well as an optical arrangement with a mirror according to the invention.

13 Claims, 5 Drawing Sheets

(56) References Cited

U.S. PATENT DOCUMENTS

| | | | |
|---|---|---|---|
| 6,467,915 | B2 | 10/2002 | Baer et al. |
| 6,483,639 | B2 | 11/2002 | Fujinoki et al. |
| 7,229,178 | B1 | 6/2007 | Headley et al. |
| 8,508,854 | B2 | 8/2013 | Eva et al. |
| 2010/0060973 | A1 | 3/2010 | Olaya et al. |
| 2012/0275041 | A1 | 11/2012 | Laslandes et al. |
| 2013/0235255 | A1 | 9/2013 | Westphal et al. |
| 2014/0125995 | A1* | 5/2014 | Schoeppach ........ G03F 7/70266 356/601 |

FOREIGN PATENT DOCUMENTS

| | | |
|---|---|---|
| DE | 698 01 731 T2 | 7/2002 |
| DE | 601 16 322 T2 | 6/2006 |
| DE | 10 2007 010 906 A1 | 9/2008 |
| DE | 100 49 296 B4 | 6/2013 |
| EP | 1 118 897 A2 | 7/2001 |
| EP | 2 515 155 A1 | 10/2012 |
| EP | 2 650 730 A2 | 10/2013 |

OTHER PUBLICATIONS

Wesemann, W., "Mathematische Anmerkungen: Welche Beziehung besteht zwischen der normalen sphäro-zylindrischen Schreibweise von Korrektionsgläsern und den Zernike-Polynomen?", Doz Optometrie, pp. 40-44 (Mar. 2005).

\* cited by examiner

ADJUSTABLE, DEFORMABLE MIRROR FOR COMPENSATING IRREGULARITIES OF A BEAM

This application is a national stage of International Application No.: PCT/EP2015/000535, which was filed on Mar. 10, 2015, and which claims priority to German Patent Application No.: 10 2014 103 157.1, which was filed in Germany on Mar. 10, 2014, and which are both herein incorporated by reference.

The invention relates to an adjustable deformable mirror for compensating aberrations of a beam and to uses of the mirror and methods for compensating aberrations using the mirror.

In the following text, the term aberrations is to be understood to mean, synoptically, a multiplicity of imaging errors. Such an imaging error is, for example, an astigmatism. Imaging errors (aberrations) can be captured as wavefront errors which can in turn be described mathematically. What are known as Zernike polynomials are very frequently used to mathematically illustrate the wavefront errors.

The even Zernike polynomials are defined by:

$$Z_n^m(\rho,\phi) = R_n^m(\rho)\cos(m\phi)$$

and the odd Zernike polynomials are defined by:

$$Z_n^{-m}(\rho,\phi) = R_n^m(\rho)\cos(m\phi),$$

where m and n are nonnegative integers, for which: n≥m. $\phi$ is the azimuthal angle and $\rho$ is the normalized radial distance.

The radial polynomials $R_n^m$ are defined as $$R_n^m(\rho) = \sum_{k=0}^{(n-m)/2} \frac{(-1)^k (n-k)!}{k!((n+m)/2-k)!((n-m)/2-k)!} \rho^{n-2k} \text{ if}$$

$n - m$ is even and $R_n^m(\rho) = 0$ if $n - m$ is odd.

They are frequently normalized to $R_n^m(1)=1$.

The subscript n here describes the radial order of the polynomial. The superscript m describes the meridional frequency, i.e. the number of oscillation periods of the periodic wavefront errors in one rotation (Wesemann, W., 2005: *Mathematische Anmerkungen: Welche Beziehung besteht zwischen der normalen sphäro-zylindrischen Schreibweise von Korrektionsgläsern und den Zernike-Polynomen?*, DOZ, 03-2005: 40-44).

A multiplicity of solutions have been proposed in the prior art to correct imaging errors, with only a few selected solutions being briefly described below.

DE 525 690 discloses an elastically deformable metal concave mirror composed of a plurality of sectors. This metal concave mirror may not be suitable for use in modern high-quality optical arrangements, but it is suited to highlighting the problems pertaining to segmented mirrors. Owing to an interruption in the continuously extending reflective surface of the sectors, local imaging errors are produced at the overlapping edges of the sectors which are located in the optical path and are illuminated by an incident beam of electromagnetic radiation. The surface undergoes an abrupt change at the edges, which produces diffraction and thus false light. They are not suitable as near-field correction elements since the interruptions would become noticeable as brightness differences in the image.

Different solutions, for example as described in DE 100 49 296 B4, use a reflectively coated membrane which is deformable in points by a number of actuating elements. This enables very fine adaptation of a surface profile of the membrane to aberrations that are to be compensated, but locally occurring deformations here also cause middle-frequency to high-frequency wavefront errors, i.e. Zernike coefficients with n>=8 have significant and thus undesirably high contributions. Furthermore, the membrane is often very uneven, such that it first needs to correct itself. The uncorrected portion of the manufacturing unevenness is added as an additional error.

A multiplicity of selectively actuatable actuating elements is also used in a deformable mirror element known from U.S. Pat. No. 5,142,132 A for achieving electrically controlled deformation for setting the focal position and for correcting aberration errors. The mirror element can either consist of an individual area of a thinly coated glass plate or of many small mirror segments. This type of deformable mirror, however, is likewise associated with the previously mentioned disadvantages.

DE 698 01 731 T2 describes an optical system for producing integrated circuits. In order to correct chromatic aberrations, a combined optics with specially adapted optical properties is used. Owing to the extremely high-energy radiation, a proposal is made to arrange, in dependence on energy density, an optical element made of a special amorphous quartz glass and an optical element made of single-crystalline fluorite at specific positions of the beam path.

EP 2 650 730 A2 discloses an apparatus for compensating aberrations, in which electrical conductors are enclosed in a mirror. By applying electric voltages and the flow of electric currents, the mirror can heat up in sections and be thermally deformed. Such a solution is relatively complicated with respect to the actuation and the structure thereof and additionally is not stable in the long run. To compensate aberrations, it must be in constant active operation.

Solutions from the prior art, based for example on MEMS or piezoelectrically operated mirrors, have residual errors typically in a range of >10 nm RMS, which are high frequency with n>=8; n>=m.

An imaging error of known origin and known propagation within an optical instrument can be corrected using an apparatus according to US 2012/0275041 A1. To this end, a deformable mirror is introduced into the optical path of the arrangement, along which the beams of electromagnetic radiation propagate. By means of suitable actuating elements, it is possible to exert forces onto the edges of the deformable mirror and introduce them into the mirror, with the result that the latter is deformed according to its known geometry and contour and the site of the force introduction and the vectors (magnitude, direction) of the introduced forces. Owing to the thus effected deformation of the mirror and the locally changed reflection behavior thereof as a consequence of optical path differences, correction of occurring wavefront errors is possible. Force introductions over the entire extent of the mirror are described as disadvantageous in the previously mentioned US 2012/0275041 A1. It is possible by lateral introduction alone to set a deformity profile of the surface of the mirror by the forces being introduced into the mirror in a controlled fashion with respect to magnitude and site of the introduction. By superpositions of the respective forces and the thus effected deformations of the mirror, it is possible to set quite a large number of deformation profiles. Although it is possible to largely avoid merely locally occurring small-space deformations with this solution, the type of the settable deformation profiles is quite limited in the case of lateral introduction of the forces.

The apparatus proposed in DE 10 2007 010 906 A1 follows a very similar principle. An optical element (mirror) is contacted at the edges thereof by the action of an actuation device (below: actuating element) and can be bent by way of corresponding feed movements of the actuating element. Even in the case of this solution, the previously mentioned disadvantages with respect to the settable types of deformation profiles occur. In addition, a mirror of this type is not suitable for use in very highly resolving optical arrangements since no sufficiently sharp imaging is achievable.

In an apparatus known from DE 601 16 322 T2, aberrations are likewise compensated by means of force introduction onto a mirror. At least one active actuating element and two so-called force bars are present for the introduction of force. The force bars have at least two ends, which engage at points of the edge region of the mirror and are arranged such that they are distributed in sections of the mirror. Owing to the point-type force introduction in the edge region of the mirror, the settable types of deformation profiles are limited as in the two previously mentioned solutions.

U.S. Pat. No. 7,229,178 B1 discloses a deformable mirror, the circular or oval mirror plate of which can be curved parabolically via an internal (smaller) and an external (larger) annular support. To this end, the mirror is held between the annular support. The force necessary herefor is introduced via a mechanical actuating element. The actuating element acts directly or indirectly via a lever on one of the annular supports. The introduction via the planar and parallel annular supports is always centrically with respect to the axis of symmetry of the mirror. The holder of the mirror consists of a noticeably high number of individual parts of complicated construction, with the result that a very high manufacturing and assembly outlay for the holder must be expected.

As described above, imaging errors can occur within optical units and be compensated there. A particular situation occurs during the assembly of optical systems (below: optical arrangements) from a plurality of optical units. Even if the individual optical units by themselves meet strict quality criteria, imaging errors of the entire optical arrangement can occur in the case of an optical arrangement using a plurality of optical units. For example, by summation of imaging errors of the individual optical units, each of which being within permissible tolerance limits, one or more inadmissible imaging errors of the optical arrangement can occur. In addition, inadmissible imaging errors of the optical arrangement can be caused by finitely exact adjustment of the individual optical units and by fluctuations, for example density differences and/or flows, of a medium located in the optical path, for example gas or a gas mixture. The stated disadvantages cannot be satisfactorily removed with the known prior art. Thus, wavelength changes occur during an exchange of the light source, or temperature and pressure effects occur owing to differences between a placement site and the site of the manufacture and quality checks of optical units.

The invention is based on the object of proposing a deformable mirror for compensating aberrations and a method for compensating aberrations, in which the disadvantages of the prior art are reduced.

This object is achieved for an adjustable deformable mirror (below: mirror, in short) for compensating aberrations of a beam of electromagnetic radiation which propagates along an optical path having a mirror element for reflecting incident rays of the beam, a main body for holding the mirror element, and at least one actuating element for introducing forces into the mirror element. In a mirror according to the invention, the mirror element is a planar element having two mutually parallel side faces, with one of the side faces facing the main body and the other side face facing the optical path. The mirror element has a thickness of at least one millimeter (1 mm) between the parallel side faces. In addition, the actuating element is a lever mechanism with lever elements having a first lever arm and a second lever arm, wherein the first lever arm is movable along a first feed path and the second lever arm is movable along a second feed path, and the lever arm ratios of which are configured such that the length of the second feed path is at most a fifth, preferably at most a tenth, of the length of the first feed path, and forces are transmittable to the planar element by the second lever arm.

The actuating element is here configured such that forces transmitted thereby are symmetrically introduceable into the planar element. The actuating element is constructed to be monolithic and mirror-symmetrical with respect to an axis of symmetry. In addition to the first and second lever arms, it has a centrally arranged torsion-resistant block, an elastically deformable element for introducing a force into the actuating element, and a bendable transmission element for introducing the force into the planar element. A compensating block is present in the block. This compensating block is likewise a constituent part of the actuating element and is nearly completely separated from the block by way of slits. Only a very narrow connecting web connects the compensating block with the block. In the region of the connecting web, the compensating block is pivotable about a fourth axis of rotation. With such a configuration, forces that act on the actuating element under an angle of not equal to 90° can be introduced symmetrically into the planar element as a result of a rotational movement of the compensating block, which has a compensating action, in cooperation with the previously mentioned elements of the actuating element.

The actuating element can advantageously be connected to the second side face via integrally formed portions such as webs or posts. The actuating element is here preferably configured such that, by way of the cooperation of the elements of the actuating element, a force that is exerted onto the actuating element is guided symmetrically, i.e. with approximately identical magnitudes and directions, to the integrally formed portions and introduced via these into the planar element.

The mirror according to the invention is provided in particular for use in high-quality optical arrangements, such as for example in a system for multispectral imaging described in US 2013/0235255 A1, and for use in environments with high to very high demands in terms of low emissions of outgassings, dust and mechanical abrasion (clean rooms). The necessary dimensions of the mirror according to the invention for use for mirrors in astronomical telescopes and in the field of the micro-optics and nano-optics cannot be attained, or can be attained only with significant outlay. For this reason, use is not envisaged for such technical fields.

The mirror according to the invention is stable in the long run, deterministic, easily settable, maintains its state in the zero-current state and is distinguished by low operating and manufacturing costs.

The planar element (mirror element) has the two side faces and, depending on the contour of the planar element, one or more end faces. If the planar element is circular or oval, for example, one circumferential end face is present. If the planar element is rectangular, for example, the planar element has four end faces.

The at least one actuating element is configured preferably such that introduction of forces does not take place via the end faces, or in other embodiments of a mirror according to the invention does not take place only via the end faces. To this end, the at least one actuating element is preferably arranged on the side face facing away from the optical path. Introduction of forces is effected preferably at this side face facing away from the optical path. What is particularly preferred is if the forces are introduced at multiple locations of the side face or over an area, such that large-area tension of the planar element is effected. What is very advantageous in the mirror according to the invention is a combination of deformations of a relatively thick planar element by bending and tension with the fundamental possibility of force introduction at each site of the planar element. An actuating element preferably has lever elements and an actuator. By way of the lever elements, feed movements of the actuator are translated and introduced into the planar element.

It is possible for example for a number of actuating elements, such as piezoelectric elements or purely mechanically acting actuating elements, such as cylinders or pressure pins, to be arranged. The at least one or the number of actuating elements is/are preferably connected to a controller, by means of which each of the actuating elements is individually actuatable. Controlling the actuating element or actuating elements is preferably effected using measurement values of at least one sensor, with necessary control signals being derivable from the measurement values of said sensor.

A deformation profile within the meaning of the description is understood to mean the form of the surface of the side face of the planar element that faces the optical path. A deformation profile can be caused by guidance of forces into the planar element, with forces being able to be positive (loading) or negative (unloading). It is also possible that no force is introduced by the actuating element or by individual actuating elements, for example in the case of determined aberrations, the measurement values of which are still within admissible tolerance limits.

One advantageous embodiment of an actuating element is that said actuating element rests flat on the side face facing away from the optical path and is mechanically connected thereto (for example integrally bonded, force-fit), for example adhesively connected, soldered or clamped or is in close spatial contact therewith, for example rests against it without gap. In the case of a deformation of the actuating element, the deformations thereof are transmitted to the planar element at a specific ratio. In one favorable embodiment, the main body itself or parts of the main body can be configured as the actuating element. For example, the main body may be a flexure hinge. In a flexure hinge, movement such as bending, torsions and displacements about axes of parts of the body serving as the flexure hinge are possible. In further embodiments, the flexure hinge can be formed by a kinematic configuration of a plurality of interacting (flexure) hinges.

A flexure hinge can be manufactured simply by erosion, for example. For example, the flexure hinge can be produced (monolithically) from one compact body of a starting material. This achieves advantageous limitation to a number of materials that are used being as small as possible.

By corresponding material selection, the coefficient of thermal expansion of the actuating element is preferably adapted to the coefficient of thermal expansion of the planar element, with the result that thermally caused material stresses are strongly reduced or avoided completely.

It is also possible in further embodiments of the mirror according to the invention for forces to be introduced into the planar element locally on the side face facing away from the optical path. Owing to the thickness of the planar element, no locally limited deformations with abrupt transitions between different regions of the deformation profile occur even in the case of a local introduction of forces, and in particular no edges, small-scale ribs with possibly a small distance with respect to one another. Instead, a deformation profile of the mirror with continuous transitions between different regions of the deformation profile is produced.

In addition to the actuating element, a separate main body for holding the planar element can be provided. The main body can be a framework, for example, on which the planar element is held.

A very expedient technical effect of the mirror according to the invention is achieved by permitting a single setting of an optical arrangement for the purposes of compensating at least one imaging error. This single setting of the optical arrangement can also be referred to as (quasi) static setting or as (quasi) static compensation of aberrations, and can be effected manually.

In further embodiments, dynamic compensation of aberrations is possible by measurement values being captured and evaluated continuously or at specific intervals, and possibly corresponding feeding of the at least one actuating element to the side face facing away from the optical path, or feeding away therefrom, being effected by the controller.

The actuating element is preferably operated manually. Cost-intensive drives such as motors can thereby be dispensed with. In addition, additional elements such as motors, transmissions etc. require additional structural outlay, in particular if the mirror is to be used under cleanroom conditions.

In such a case, adverse effects, for example due to abrasion or so-called VOCs (volatile organic compounds), should be limited as much as possible.

The side face of the planar element or the mirror facing the optical path preferably has an irregularity of less than 6 nm RMS (ISO 11010-5, ISO 14999:2007, 3.3; ISO 10110-5:2008-12; ISO 10110-5: 2007; ISO 10100-14-2007). The planar element exhibits this irregularity (surface form deviation) after its production in a starting state. The planar element is thus an optical component of very high quality. Aberrations which are greater than 6 nm, for example up to 20 nm RMS, can then be compensated by way of deformations of the planar element mounted on the mirror.

The planar element can consist of only one layer.

In further embodiments, the planar element can be provided with one or more layers which have reflective action. In addition, filter functions can be effected by way of one or more layers.

The material of the planar element is, for example, quartz glass, a glass-ceramic material such as Zerodur®, a titanium silicate glass such as ULE® Glass, calcium fluoride ($CaF_2$), a borosilicate glass such as for example the glass having the designation S-BSL7 from OHARA GmbH, or a crown glass such as for example the borosilicate crown glass N-BK7® from SCHOTT AG.

It is very advantageous if a mirror according to the invention consists of as few individual elements as possible. The number of elements is reduced, for example, if the planar element consists of only one layer and the main body also acts as the actuating element and is configured as a flexure hinge. By way of reducing the number of individual elements, the mirror according to the invention is utilizable for example in clean rooms.

It is advantageous in particular for statically effected compensation of aberrations if the forces to be introduced are able to be set very precisely and be maintained precisely over long periods of time from a few days to a few months. In one advantageous embodiment of a mirror according to the invention, the actuating element to this end has lever elements having lever arms, one lever arm of which being movable along a first feed path and the second lever arm of which being movable along a second feed path, and the lever arm ratios thereof being such that the length of the second feed path is at most half, but preferably at most a tenth, of the length of the first feed path, and forces are able to be transmitted onto the mirror element by way of the second lever arm. The first lever arm and the second lever arm act together within the meaning of the principle of the lever.

A mirror according to the invention is advantageously utilizable for compensating aberrations of a beam of electromagnetic radiation in the wavelength range of less than 410 nm, in particular in the wavelength range of DUV radiation.

A mirror according to the invention can here be used very expediently for compensating astigmatism, in particular on an optical axis. Owing to the settable and continuous deformation profile, the mirror according to the invention is very well suited for compensating aberrations which can be described by means of the Zernike polynomials with the variables m and n. The compensation is here preferably carried out for aberrations of up to $|m|<4$ and $|n|\leq 4$ or the linear combinations thereof. In consequence, the use according to the invention of the mirror, which is likewise according to the invention, results in changes (deformations) in the deformation profile by means of which low-frequency aberrations are able to be compensated. Similar is true if deviating polynomials or other base functions, such as Fourier series, Laguerre, Hermite, Bessel functions or other function systems are used.

Using a mirror according to the invention, a compensation of aberrations is possible in which any residual errors are low-frequency ($|m|<4$ and $|n|\leq 4$) and at least 6 times smaller than (typically high-frequency) residual errors that are obtained according to prior art solutions.

Using a mirror according to the invention, a reduction in degrees of freedom to the lowest number possible is achieved. Since the focus of an optical system or of an optical arrangement can usually be set externally, the error of next greater magnitude is the astigmatism. This is settable very precisely (for example 1 nm RMS), accurately and reproducibly (for example 2 nm RMS wavefront error) by means of the mirror according to the invention.

A highly expedient use of a mirror according to the invention takes place if the mirror is arranged between optical units in an optical arrangement. Here, preferably the above-mentioned aberrations, in particular astigmatism, are compensated.

An optical unit is for example a stand-alone optical module, such as for example a radiation source for providing a beam of electromagnetic radiation, and imaging optics, for example an arrangement for focusing beams of electromagnetic radiation, or an arrangement of filters and for example a sensor. An optical unit consists of at least two optical elements, such as for example optical lenses, reflectors, collimators and so on.

The mirror according to the invention is here provided only for compensating aberrations and possibly also for beam deflection. It can be arranged in optical arrangements with a folded optical path instead of one or more deflection elements, such as for example deflection mirrors.

The object is additionally achieved for a method for compensating aberrations of a beam of electromagnetic radiation along an optical path. The method has the steps of:
- a) providing either at least two optical units or at least two optical elements,
- b) providing a mirror according to the invention,
- c) arranging the mirror between the optical units or between the optical elements in the optical path,
- d) capturing aberrations of the beam as spatially resolved measurement values,
- e) calculating spatially resolved deformations of the mirror which are necessary for compensation of the aberrations,
- f) calculating first and second feed paths which are necessary for effecting the calculated spatially resolved deformations,
- g) controlling the at least one actuating element and effecting the calculated first and second feed paths.

It is furthermore possible for the mirror according to the invention to be set according to an (integrated) measurement value and not according to spatially resolved measurement values. This setting can be effected manually and be directed for example at maximization of a measurement value of a selected parameter. Here, the steps d) to g) of the method according to the invention can be dispensed with. Maximization of a measurement value can also be understood to mean optimization. A selected parameter can be an intensity, for example. The measurement value can be given, for example, by an intensity signal.

The controlling in step g) is effected using control signals which are generated on the basis of the calculated first and second feed paths. The control signals are transmitted, for example, via direct data links, for example per single wiring, wirelessly per radio or per optical data transmission, to the actuating element or the actuating elements. In other embodiments of the invention, data transmission can also be effected using bus systems.

Capturing the aberrations in step d) can be effected by known methods, for example by measurements according to the Hartmann-Shack principle or using an interferometer. To this end, a sensor or a plurality of suitable sensors, such as for example Shack-Hartmann sensors, can be used.

The measurement position at which the relevant measurement values are captured along the optical path is known by way of spatially resolved capturing of the measurement values. In addition, the spatial distribution of the captured measurement values over the cross section of the beam is known. The distribution of the captured measurement values can be described by way of a suitable coordinate system, for example with the aid of a polar coordinate system.

The calculation in step f) is effected at least taking into account the captured measurement values. Here, the captured measurement values can serve for example as criteria for selecting specific calculation models; however, they are not used as variables in the calculation. In further embodiments of the method, the calculation can be effected using the captured measurement values; these are then used directly as variables in a calculation.

When carrying out the method according to the invention, it is possible in a further embodiment of the method for an additional step d2) to be carried out between the steps d) and e), in which the captured measurement values are compared to admissible tolerance limits and the steps e) to g) are carried out only if the measurement values exceed the admissible tolerance limits, or alternatively the method is terminated if the measurement values fall below the admissible tolerance limits.

If the method according to the invention is carried out according to the first alternative, i.e. carrying out steps e) to g) only if the measurement values exceed the admissible tolerance limits, it is expedient if, after effecting the first and second feed paths, aberrations of the beam are captured again as measurement values. In this way, success monitoring of the complete feeds and the effects of the force introductions are provided.

It is possible in further embodiments of the invention for the measurement values which have been captured again to be used for adapting the calculation algorithms to specific operating conditions, for example pressure and temperature, the optical arrangement and specific properties of the planar element, for example individual thermal expansion behavior, individual surface errors, individual bending (deformation) behavior.

The method according to the invention with its embodiments is preferably carried out for compensating aberrations and in particular for compensating an astigmatism.

The object is further achieved by way of an optical arrangement in which a mirror according to the invention is arranged. By way of the method according to the invention and the mirror according to the invention, a simple option is proposed for compensating an imaging error in the case of a number of stand-alone optical units which are installed in an optical arrangement along an optical path and intended to cooperate here. Such imaging errors can occur even if the individual optical units have each successfully passed corresponding quality checks before their installation in the optical arrangement. The compensation can be carried out without disassembling the optical units or changing the internal settings and adjustments thereof. It is also possible to retrofit an existing optical arrangement with a mirror according to the invention.

If, in further embodiments of the method according to the invention, of the mirror according to the invention or of an optical arrangement according to the invention, the beam is split into partial beams and guided along the optical path or along different optical paths, the described technical features, method steps and effects correspondingly apply.

The invention will be explained in more detail below with reference to exemplary embodiments and figures, in which.

Figure 1:
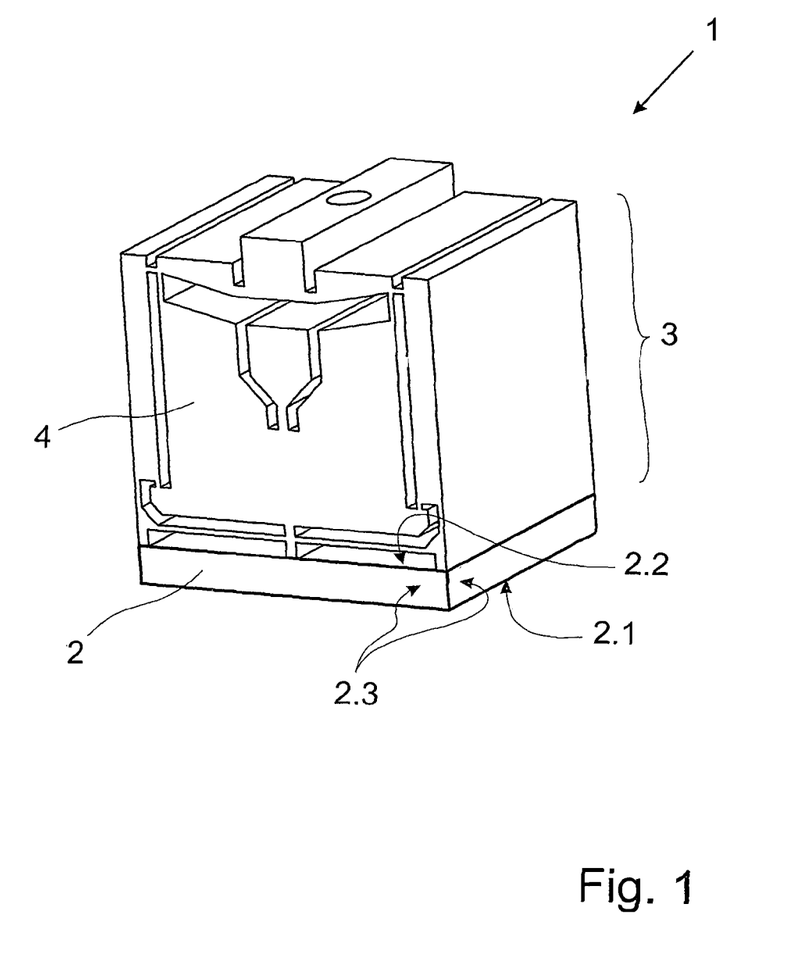
FIG. 1 shows a first exemplary embodiment of an adjustable deformable mirror according to the invention.

In a first exemplary embodiment of a mirror 1 according to the invention, FIG. 1 shows, as essential elements, a mirror element in the form of a planar element 2, and an actuating element 4.

The planar element 2 has a first side face 2.1 and a second side face 2.2, which extend parallel with respect to one another. The first side face 2.1 faces away from a main body 3, while the second side face 2.2 faces the main body 3. The planar element 2 has a rectangular shape with four end faces 2.3 (two of which are shown). The planar element 2 is fixed to the main body 3 and held thereby. The main body 3 is configured as a flexure hinge which is in direct contact with the second side face 2.2, with the result that at the same time the actuating element 4 is formed by the main body 3. The flexure hinge is formed by a kinematic configuration of a plurality of cooperating (flexure) hinges.

Figure 2:
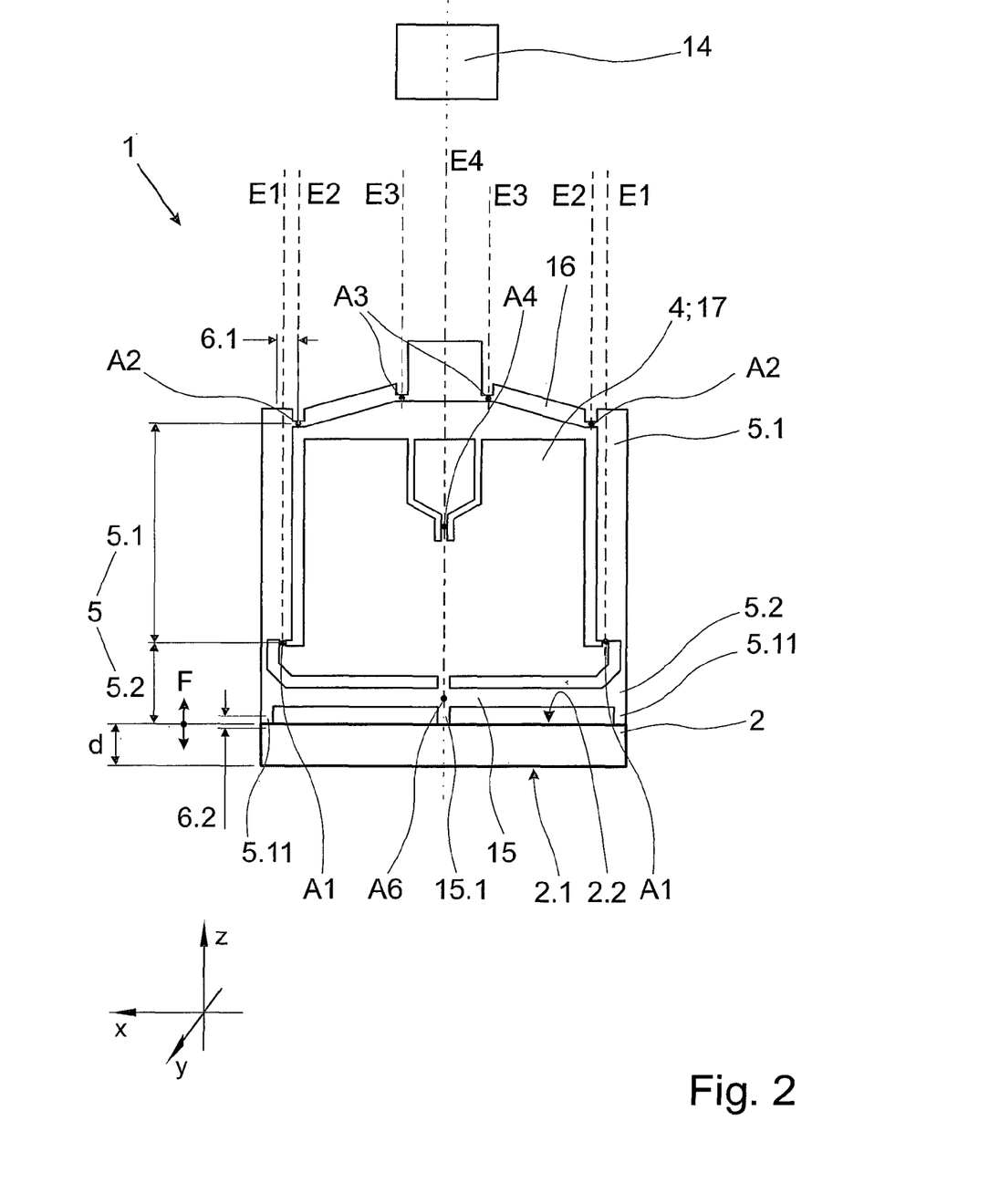
FIG. 2 shows a sectional view of the first exemplary embodiment of the adjustable deformable mirror according to the invention.

For the purposes of an explanation of the actuating element 4 shown in the sectional view of the first exemplary embodiment in FIG. 2, a Cartesian coordinate system having an x-axis, a y-axis and a z-axis is indicated. In another relative orientation of a coordinate system and an actuating element 4 with respect to one another, the following description should be understood accordingly. The same applies to the terms "top/up" and "bottom/down" which are used below. Here, "top/up" is understood to mean a direction of increasingly positive values on the z-axis of the shown coordinate system.

The actuating element 4 has lever elements 5. Laterally arranged on the actuating element 4 are two first lever arms 5.1, which extend in the direction of the z-axis from the bottom upward and are pivotable along a first feed path 6.1 about the y-axis. The first and second side faces 2.1, 2.2 of the planar element 2 extend parallel to a plane that is defined by the x-axis and the y-axis.

The ends of the first lever arms 5.1 shown at the top of FIG. 2 are hinged to an elastically deformable element 16, which in turn is connected to an actuator 14, by way of whose feed movements the first lever arms 5.1 are pivotable about the y-axis. Shown here is an embodiment of an elastically deformable element 16, the cross section of which is reduced sectionally to permit bending of the elastically deformable element 16 and resulting length changes of the elastically deformable element 16.

The first lever arms 5.1 are pivotable about a first rotation axis A1 about the y-axis. The first rotational axis A1 is situated in a first plane E1. The elastically deformable element 16 has a second rotation axis A2 in a second plane E2, and a third rotation axis A3 in a third plane E3, which are effected by reductions in the cross section (hinges) of the elastically deformable element 16 and are situated in the two planes E2 and E3 which are offset with respect to one another in the direction of the z-axis. The magnitude of this offset of the planes E2 and E3, and also of these two planes E2, E3 with respect to plane E1, decisively determines the resolution and the actuating range of the actuating element 4. A central web 15.1 is pivotable about a sixth rotation axis A6, which is situated in a fourth plane E4. The fourth plane E4 extends along a line of symmetry in the longitudinal direction (in the direction of the z-axis) of the central web 15.1. The rotation axes A1, A2 and A3 and the planes E1, E2 and E3 are mirror-symmetrical with respect to plane E4. The elastically deformable element 16 is configured to be mirror-symmetrical with respect to plane E4.

The movements, displacements and rotations described below are to be understood as relative movements.

Situated at the ends of the first lever arms 5.1, shown at the bottom of FIG. 2, is in each case a second lever arm 5.2, which is likewise pivotable about the y-axis along a second feed path 6.2. The ends of the first lever arms 5.1 which point downward are configured as webs 5.11, in a starting state of the mirror 1 rest against the second side face 2.2 and are connected therewith. In addition, the webs 5.1 are displaceable in the direction of the x-axis. By way of a bendable transmission element 15 which extends in the direction of the x-axis, the two webs 5.11 are mechanically coupled to one another. Situated in the center of the transmission element 15, and thus halfway between the two webs 5.11, is the central web 15.1, which projects from the transmission element 15 toward the bottom in the direction of the z-axis and is likewise connected to the second side face 2.2. In a starting state, in which no forces F, except for the necessary holding forces, are introduced into the planar element 2, the webs 5.11 and the central web 15.1 project downward by an identical distance. The second side face 2.2 rests against the webs 5.11, while said side face is connected to the central web 15.1 in an integrally bonded fashion by way of adhesive bonding or soldering.

In further embodiments of the mirror 1 according to the invention, a force-fit and/or form-fit connection can also be implemented.

The second lever arms 5.2 are connected to one another via a bending-resistant and torsion-resistant block 17. The block 17 ensures that a movement of the second lever arms 5.2 in the direction of the x-axis does not lead to bending of part of the actuating element 4, but that the block 17 is lifted or lowered in the direction of the z-axis, depending on whether the second lever arms 5.2 are moved toward one another or away from one another. The central web 15.1 is mechanically fixed and connected rigidly in the direction of the z-axis to the block 17 such that either a tensile force or a compressive force can be introduced into the planar element 2 via the second side face 2.2 by way of the central web 15.1.

Once the actuator 14 is activated, and on account of the action thereof, the first lever arms 5.1 are moved along the first feed path 6.1, and the second lever arms 5.2 are moved along the second feed path 6.2 according to the lever ratio between the first lever arms 5.1 and the second lever arms 5.2. As a result of the movement along the second feed path 6.2 and the associated pivoting movement about the y-axis, the webs 5.11 are moved in the direction of the x-axis. Owing to the small distances that are traveled in the process, this can be referred to simply as a displacement in the direction of the x-axis. Depending on the direction of the feed movement of the actuator 14, the webs 5.11 are displaced toward one another or away from one another.

If the webs 5.11 are displaced toward one another, the block 17 is lifted upward in the direction of the z-axis. As a result, the central web 15.1 is also lifted and thereby a force F is introduced into the planar element 2 in the form of a tensile force, the direction and exemplary magnitude of which is schematically illustrated by the arrow direction and arrow length. At the same time, the webs 5.11 are moved toward each other, with the result that forces F which point in the direction of the x-axis are introduced into the planar element 2 in the form of compressive forces. As a result, the planar element 2 is deformed. The thus effected deformation profile can be described in simplified terms as a concave first side face 2.1.

However, if the webs 5.11 are displaced away from one another, the block 17 is lowered downward in the direction of the z-axis. As a result, the central web 15.1 is also lowered, and a force F is thus introduced into the planar element 2 in the form of a compressive force. At the same time, the webs 5.11 are moved away from one another, with the result that forces F which point in the direction of the x-axis are introduced into the planar element 2 in the form of tensile forces. Consequently, the planar element 2 is deformed. The thus effected deformation profile can be described in simplified terms as a convex first side face 2.1.

The actuating element 4 and the lever elements 5 implement a lever mechanism which is connected serially one behind the other. The actuating element 4 is configured such that the force F to be introduced is distributed symmetrically with respect to the central web 15.1 to the two displaceable webs 5.11.

The planar element 2 has, in the first exemplary embodiment, a thickness d of 1.5 mm and is made of a layer of borosilicate glass. The surface of the first side face 2.1 has a surface quality of 6.5 nm RMS according to ISO 11010-5.

Figure 3:
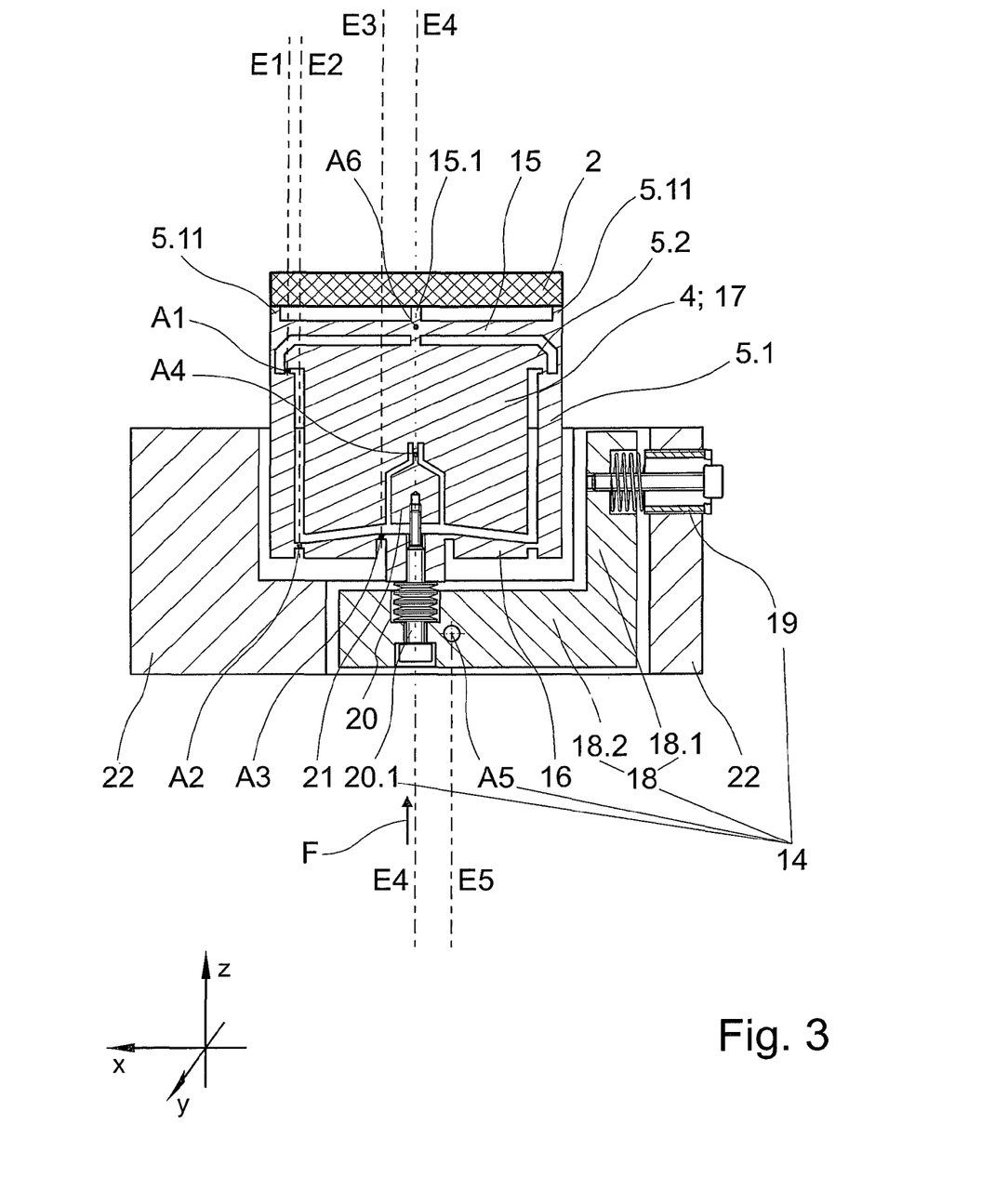
FIG. 3 shows a second exemplary embodiment of an adjustable deformable mirror according to the invention.

In a second exemplary embodiment according to FIG. 3, a mirror 1 is shown, which corresponds in principle to the first exemplary embodiment. For the sake of clarity, a few symmetric elements are shown on only one side of the mirror 1. The block 17 of the actuating element 4 is mechanically fixed and connected rigidly to a bearing structure 22 via a screw connection (not shown). Situated at the actuator 14 is an angled lever 18 with a first arm 18.1 and a second arm 18.2, which is mounted rotatably about a fifth rotation axis A5. Situated at a first arm 18.1 of the lever 18 is a first adjusting unit 19, by means of which a relative position of the lever 18 with respect to the bearing structure 22 is settable. The second arm 18.2 of the lever 18 is connected to the elastically deformable element 16. Situated at the second arm 18.2 of the lever 18 is a second adjusting unit 20. The latter has a spring-mounted screw 20.1, which is mechanically connected to a compensating block 21. The compensating block 21 is part of block 17 and is nearly completely separated therefrom by slits. The compensating block 21 is connected to the block 17 only at a narrow connecting web. The narrow connecting web forms a fourth rotation axis A4, which is located in the fourth plane E4. Upon introduction of a force F from the screw 20.1 with a closed force flow through the main body 3 or through the actuating element 4, the fourth rotation axis A4 serves for distributing the force F symmetrically on both sides of the actuating element 4 and the webs 5.11.

If the lever 18 is pivoted about a fifth rotation axis A5, the elastically deformable element 16 is deflected, as explained above, in the direction of the z-axis. By rotation about the fifth rotation axis A5, the second arm 18.2 is fed over its length by different distances toward the elastically deformable element 16. These albeit very small distances and distance differences are compensated again by cooperation of the second adjusting unit 20 and the compensating block 21. The compensating block 21 is pivotable about the fourth rotation axis A4 over the width of the slits, with the result that a compensating movement with respect to the rotation movement about the fifth rotation axis A5 can be attained. Consequently, the actuating movements of the elastically deformable element 16 and the forces F transmitted to the webs 5.11 and to the central web 15.1 are symmetrically distributed.

Figure 4:
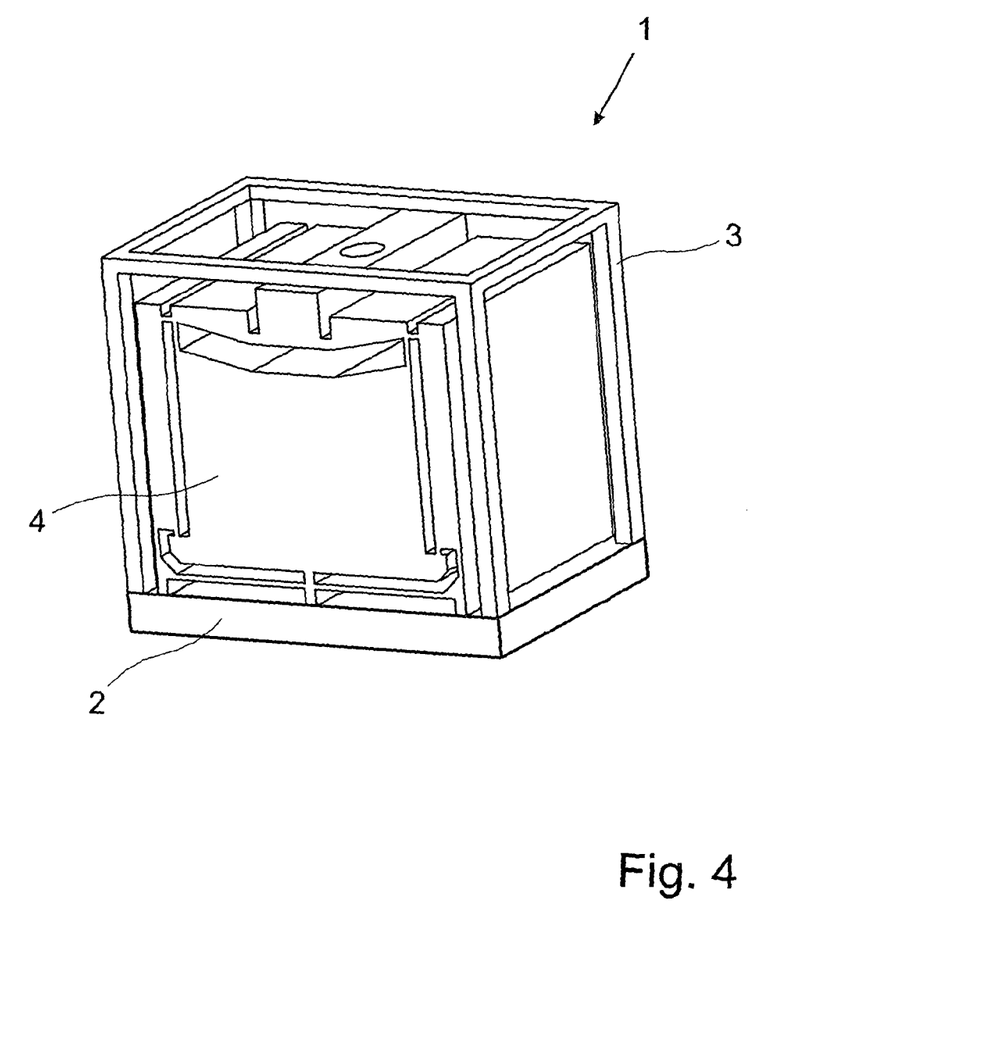
FIG. 4 shows a third exemplary embodiment of an adjustable deformable mirror according to the invention.

In a third exemplary embodiment of the mirror 1 according to the invention, the planar element 2 is held by the main body 3 (FIG. 4). In addition, the actuating element 4 is present, by means of which forces F can be introduced into the planar element 2.

Figure 5:
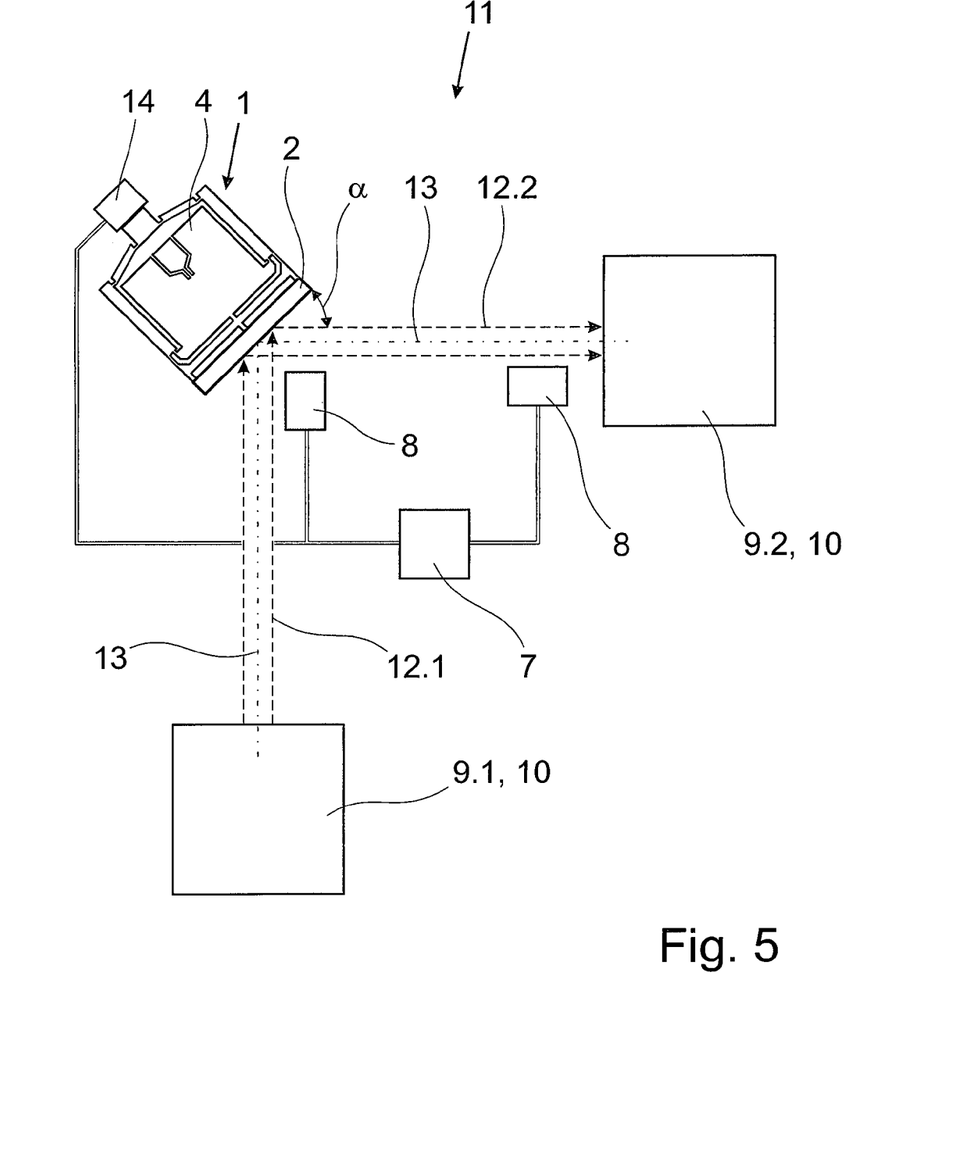
FIG. 5 shows a first exemplary embodiment of an optical arrangement having a mirror according to the invention.

A first exemplary embodiment of an optical arrangement 11 having a mirror 1 according to the invention is shown in FIG. 5 in strongly schematic fashion. Arranged between a first optical unit 9.1 and a second optical unit 9.2 is the mirror 1 such that incident beams 12.1 of electromagnetic radiation which come from the first optical unit 9.1 and propagate along an optical path 13 are incident on the first side face 2.1 (see for example FIG. 2). Incident beams 12.1 are reflected by the first side face 2.1 and propagate further as reflected beams 12.2 along the optical path 13 to the second optical unit 9.2.

In a further exemplary embodiment, instead of the first optical unit 9.1 and the second optical unit 9.2, optical lenses are arranged as optical elements (generally referred to as 10) in the optical arrangement.

In a section of the optical path 13 along which the incident beams 12.1 propagate, a sensor 8 for capturing wavefront errors is arranged. With said sensor, wavefront errors of the incident beam or beams 12.1 are captured as spatially resolved measurement values. The captured measurement values are transmitted to a controller 7 which is configured such that thereby control signals are derivable from the captured measurement values. Here, spatially resolved deformations of the mirror 1 are calculated, which are necessary for compensating the determined aberrations. Once the spatially resolved deformations are calculated, feed paths 6 (see for example FIG. 2), in particular first and second feed paths 6.1, 6.2 (see for example FIG. 2), are calculated, which are necessary for effecting the calculated spatially resolved deformation. Here, the current deformation profile of the planar element 2 is taken into consideration in the calculation. Subsequently, control signals are generated by way of which the lever elements 5 (see for example FIG. 2) can be moved along calculated feed paths 6 with the correct directions and magnitudes. These control signals are passed on to the actuating element 4 of the mirror 1. As a consequence of the control signals, the lever elements 5 are activated and moved along the calculated feed paths 6.

If a plurality of actuators 14 are present at the mirror 1, the calculations are carried out in each case for said actuators 14, wherein interactions of actuating movements and force introductions in dependence on the material properties of the planar element 2 and on the current deformation profile thereof are taken into consideration during the calculations. The control signals are generated correspondingly specifically for the actuators 14 and passed on to them in a targeted fashion.

As a consequence of the actuating movements of the actuators 14 and of the actuating element 4, forces F are introduced into the planar element 2. The latter is deformed in dependence on magnitude and direction of the forces F and on the respective site of the introduction into the planar element 2. The deformation profile of the planar element 2 that is due to the deformations causes rays of the incident beam 12.1 to be reflected (only shown by way of example) in dependence on their incidence site on the first side face 2.1 at a respective reflection angle α (alpha). The respective reflection angles α are set such that the aberrations to be compensated in the reflected beam 12.1 are reduced or completely removed.

In a section in which the reflected beam 12.1 propagates along the optical path 13, a further sensor 8 for spatially resolved capturing of wavefront errors is arranged. With this further sensor 8, measurement values are captured in spatially resolved fashion and passed on to the controller 7. Here, the measurement values captured by the further sensor 8 are compared to admissible tolerance limits. If the measurement values exhibit aberrations in the reflected beam 12.2 that are outside admissible tolerance limits, new calculations are effected by the controller 7 and corresponding control signals are generated and transmitted to the actuator 14 or actuators 14 in order to readjust the deformation profile such that the captured measurement values in the reflected beam 12.2 fall within the tolerance limits.

In further embodiments of the invention, provision is made for the measurement values captured in the reflected beam 12.2 to be used to adapt the calculation algorithms of the controller 7 to specific operating conditions and specific properties of the planar element 2.

LIST OF REFERENCES 1 mirror
2 planar element
2.1 first side face
2.2 second side face
2.3 end faces
3 main body
4 actuating element
5 lever element
5.1 first lever arm
5.11 web
5.2 second lever arm
6 feed path
6.1 first feed path
6.2 second feed path
7 controller
8 sensor
9 optical unit
9.1 first optical unit
9.2 second optical unit
10 optical element
11 optical arrangement
12.1 incident beams (of electromagnetic radiation)
12.2 reflected beams (of electromagnetic radiation)
13 optical path
14 actuator
15 transmission element
15.1 central web
16 elastically deformable element
17 block
18 lever
18.1 first arm
18.2 second arm
19 first adjusting unit
20 second adjusting unit
20.1 screw
21 compensating block
22 bearing structure
d thickness
F force
A1 first rotation axis
A2 second rotation axis
A3 third rotation axis
A4 fourth rotation axis
A5 fifth rotation axis
A6 sixth rotation axis
E1 first plane
E2 second plane
E3 third plane
E4 fourth plane
α reflection angle

The invention claimed is:

1. An adjustable deformable mirror for compensating aberrations of a beam of electromagnetic radiation which propagates along an optical path comprising:
    a mirror element for reflecting incident rays of the beam,
    a main body for holding the mirror element, and
    at least one actuating element for introducing forces into the mirror element, wherein
    the mirror element is a planar element having two mutually parallel side faces wherein a first side face faces the optical path and a second side face faces the main body, wherein the planar element has a thickness of at least 1 mm between the parallel side faces, wherein the actuating element has a lever mechanism with lever elements having a first lever arm and a second lever arm, wherein the first lever arm is movable along a first feed path and the second lever arm is movable along a second feed path, and the lever arm ratios of which are configured such that the length of the second feed path is at most a fifth of the length of the first feed path, and forces are transmittable to the planar element by the second lever arm, and wherein the actuating element is a flexure hinge, which is constructed monolithically and mirror-symmetrically with respect to an axis of symmetry of the actuating element and has, in addition to the first and second lever arms, a centrally arranged torsion-resistant block, an elastically deformable element for introducing the force into the actuating element, and a bendable transmission element for introducing the force into the planar element, and a compensating block is present in the block, which compensating block is nearly completely separated from the block by slits and is connected to the block only via a narrow connecting web, with the result that the compensating block is pivotable in the region of the connecting web about a fourth rotation axis.

2. The mirror as claimed in claim 1, wherein the actuating element is connected to the second side face via webs.

3. The mirror as claimed in claim 1, wherein the first side face facing the optical path has, in a starting state of the planar element, a surface quality of less than 6 nm RMS.

4. The mirror as claimed in claim 1, wherein the planar element consists of a quartz glass, calcium fluoride, a borosilicate glass or a crown glass.

5. The use of a mirror as claimed in claim 1 for compensating aberrations between optical units of an optical arrangement.

6. A method for compensating aberrations of a beam of electromagnetic radiation along an optical path comprising:
a) providing either at least two optical units or at least two optical elements,
b) providing a mirror as claimed in claim 1,
c) arranging the mirror between the optical units or between the optical elements in the optical path,
d) capturing aberrations of the beam as spatially resolved measurement values,
e) calculating spatially resolved deformations of the mirror which are necessary for compensation of the aberrations,
f) calculating first and second feed paths, which are necessary for effecting the calculated spatially resolved deformation,
g) controlling at least one actuating element and effecting the calculated first and second feed paths.

7. The method as claimed in claim 6, wherein an additional step d2) is carried out between steps d) and e), in which the captured measurement values are compared to admissible tolerance limits and the steps e) to g) are carried out only if the measurement values exceed the admissible tolerance limits, or alternatively the method is terminated if the measurement values fall below the admissible tolerance limits.

8. The method as claimed in claim 6, first alternative, wherein, after effecting the first and second feed paths, aberrations of the beam are captured again as measurement values.

9. The method as claimed in claim 6, wherein only the steps a) to c) are carried out, and then the first and second feed paths are effected until an optimized measurement value of a selected parameter is set.

10. The method as claimed in claim 1, wherein the aberration is an astigmatism.

11. The method as claimed in claim 5 for compensating aberrations, which can be described by means of the Zernike polynomials having the variables m and n, wherein the compensation is carried out for aberrations up to $|m|<4$ and $|n|\leq 4$ or the linear combinations thereof.

12. The mirror as claimed in claim 1, wherein the mirror compensates aberrations of a beam of electromagnetic radiation in the wavelength range of DUV radiation.

13. An optical arrangement having a mirror as claimed in claim 1.

* * * * *